No. 878,179. PATENTED FEB. 4, 1908.
E. A. BARBER.
STREET CAR MOTOR MOUNTING.
APPLICATION FILED JULY 18, 1907.

WITNESSES:
C. H. Walker.
J. M. Wynkoop.

INVENTOR
Edward A. Barber
BY Knight Bros
Attorneys

UNITED STATES PATENT OFFICE.

EDWARD A. BARBER, OF WATERTOWN, NEW YORK.

STREET-CAR-MOTOR MOUNTING.

No. 878,179.　　　Specification of Letters Patent.　　　Patented Feb. 4, 1908.

Application filed July 18, 1907. Serial No. 384,483.

*To all whom it may concern:*

Be it known that I, EDWARD A. BARBER, a citizen of the United States, residing at Watertown, in the county of Jefferson and State of New York, have invented certain new and useful Improvements in Street-Car-Motor Mountings, of which the following is a specification.

In the systems now in use in street railway car construction, the electric motor is supported at one end through the medium of its housing, directly upon the axle through which the car is driven, and is suspended at its other end from some member of the truck frame with which the motor is yieldingly connected or which member is itself yieldingly connected with the truck, the motor being in either case suspended with some movement both transversely and vertically; and in order to limit the transverse movement of the motor upon the driven axle and maintain the driving connection between the armature pinion and the axle gear, thrust collars have been provided on the axle in impinging relation to the bearings by which the motor housing is supported on the axle. But axles provided with thrust collars are more expensive than plain axles and the constant impinging of the thrust collars against the ends of the motor bearings, on the axle, draws the lubricant through said bearings and deposits it on the way. This deposit of the lubricant is not only wasteful, but it causes annoyance which railroad operators and municipal governments have both been anxious to eliminate.

My invention avoids the several objections above enumerated by connecting the motor housing or other suitable part of the motor rigidly to the truck, by means which not only prevents vertical movement, but is capable of holding the motor against lateral play with such security as to entirely avoid the necessity for thrust collars on the axle and thus avoid the waste of lubricant and soiling of the roadway. Such movement as the axle is permitted to have by its journal bearings, causes slight relative movement between the driving and driven gears between the motor and axle which serves to distribute the lubricant over the bearing surfaces but not beyond them to any objectionable extent.

Figure 1:
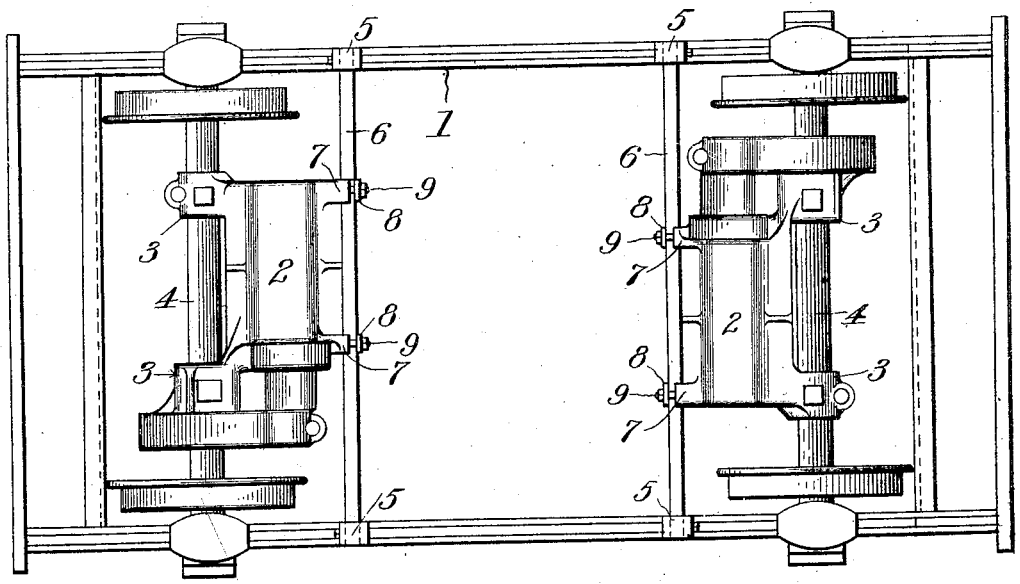
Figure 2:
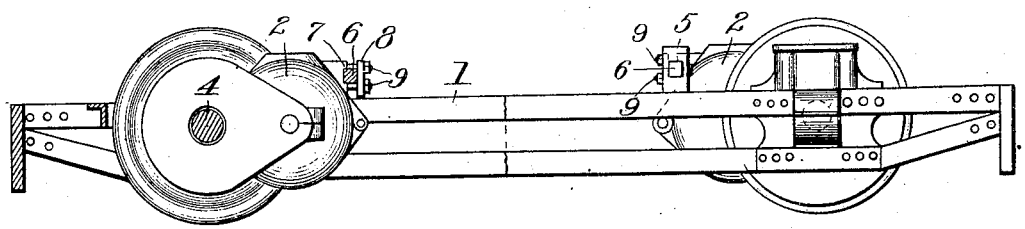

In the drawing, Figure 1 is a top plan view of a car truck embodying my invention, Fig. 2 is a side elevation of the same, partly in section.

1 represents a car truck frame of approved type. 2 is a motor provided with integral bearings 3, extending from one end thereof and adapted to be clamped around the axle 4. The truck, the motor, and the bearings supporting the motor on the axle are all of well-known type, and I make no claim thereto *per se*.

5 are standards mounted in the side frames of the truck and disposed in pairs diametrically opposite each other.

6 is a truss rod, the ends of which are secured to the standards 5, said truss rod extending transversely of the truck.

The motor casing is provided with suitable lugs 7 arranged in pairs at one end, adapted to fit over and rest upon the truss rod 6.

8 is a plate adapted to rest upon one face of the truss rod.

9 are bolts, by means of which the lugs 7 and plate 8 are rigidly clamped to the truss rod 6, whereby the motor is rigidly fixed against transverse movement on the truck.

Of course, it will be understood that any approved means may be employed as a substitute for the lugs 7 and plate 8, for rigidly securing one end of the motor to the truss rod 6 against transverse movement, I have found the construction shown to be practical and durable.

The truss rod 6 not only serves as a bearing for one end of the motor, but at the same time serves to "tie in" the side frames of the truck, thus increasing its strength and making the structure sufficiently rigid to sustain the entire motor against lateral movement relatively to the driven axle, to any objectionable extent, and rendering the use of thrust collars on the axle wholly unnecessary. A further advantage arising from this construction lies in the fact that the motor housing is firmly held in its position normal to the axle and undue wear on the bearings between the housing and the axle, due to relative angular movement of the motor is done away with.

I have found from actual use of the construction shown that the ordinary springs of the truck afford sufficient resiliency for the motor to protect it against damage by reason of any jar that the truck may be subjected to.

What I claim is.

1. In a car the combination with the truck, of a transverse rod rigidly secured thereto and extending transversely thereof, and a motor, one end of which is rigidly secured to said rod while its other end is mounted on an axle of the truck.

2. In a railway truck for street railway cars the combination of the rigid truck frame having an axle suitably mounted therein, a motor having bearings upon and driving connection with the axle and a transverse bar rigidly connected at its ends to the rigid truck frame and having the motor connected thereto and rigidly secured against movement thereon.

3. In a railway truck for street railway cars the combination of the rigid truck frame having an axle suitably mounted therein, a motor having bearings upon and driving connection with the axle and a transverse bar rigidly connected at its ends to the rigid truck frame and having the motor connected thereto at a plurality of points and rigidly secured against movement thereon or angular movement relatively thereto.

4. In a truck for street railway cars the combination of the rigid truck frame having an axle mounted therein, a motor mounted upon the axle through bearings free from lateral abutment on the axle, and in driving relation to the axle and a transverse bar rigidly connected at its ends to the rigid truck frame and having the motor connected therewith at a plurality of points and rigidly secured against both vertical and transverse movement thereon The foregoing specification signed at Watertown N. Y. this sixth day of June, 1907.

EDWARD A. BARBER.

In presence of witnesses—
ALBERT H. LEFEBVRE,
WILLIAM R. CLARK.